US008777469B2

(12) United States Patent
Masuda et al.

(10) Patent No.: US 8,777,469 B2
(45) Date of Patent: Jul. 15, 2014

(54) LIGHT SOURCE MODULE AND VEHICULAR LAMP

(75) Inventors: Osamu Masuda, Shizuoka (JP); Takeshi Ohmi, Shizuoka (JP); Kiyoshi Sazuka, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 1019 days.

(21) Appl. No.: 12/691,267

(22) Filed: Jan. 21, 2010

(65) Prior Publication Data

US 2010/0188865 A1 Jul. 29, 2010

(30) Foreign Application Priority Data

Jan. 23, 2009 (JP) ................................ 2009-012849

(51) Int. Cl.
*B60Q 1/04* (2006.01)

(52) U.S. Cl.
USPC ......... 362/539; 362/538; 362/249.02; 29/558

(58) Field of Classification Search
USPC ............ 362/249.02, 507, 518, 519, 538, 539, 362/545, 549; 257/88, 93, 98–100; 29/557, 29/558
See application file for complete search history.

(56) References Cited

U.S. PATENT DOCUMENTS 6,835,960 B2 * 12/2004 Lin et al. ......................... 257/81
6,874,910 B2 * 4/2005 Sugimoto et al. ............. 362/294
7,188,985 B2 * 3/2007 Ishida ........................... 362/548
7,521,724 B2 * 4/2009 Chen et al. ...................... 257/95
7,777,235 B2 * 8/2010 Mazzochette et al. .......... 257/81
7,777,238 B2 * 8/2010 Nishida et al. .................. 257/88
8,120,045 B2 * 2/2012 Kwon et al. .................... 257/88
2006/0103302 A1 5/2006 Tanaka et al.
2008/0008427 A1 1/2008 Takeda et al.
2010/0033985 A1 * 2/2010 Hsu et al. ...................... 362/539

FOREIGN PATENT DOCUMENTS

JP 11219960 A * 8/1999
JP 2005209536 A 8/2005
JP 2006-073842 A 3/2006
JP 2006140197 A 6/2006
JP 2008-016362 A 1/2008
JP 2008198891 A 8/2008

OTHER PUBLICATIONS

English abstract of JP2006073842 published on Mar. 16, 2006, esp@cenet database, 1 page.
Office Action Issued in Japanese Application No. 2009-012849, Dated: Dec. 3, 2012 (4 pages with English Translation).
English Patent Abstract of JP 2008198891 from esp@cenet, Publication Date: Aug. 28, 2008 (2 Pages).
English Patent Abstract of JP 2005209536 from esp@cenet, Puiblication Date: Aug. 4, 2005 (2 Pages).

* cited by examiner

*Primary Examiner* — Hargobind S Sawhney
(74) *Attorney, Agent, or Firm* — Osha Liang LLP

(57) ABSTRACT

A light source module includes a substrate made with a recess portion formed on one face and an unformed portion not having the recess portion formed therein; a light emitting diode disposed on the recess portion of the substrate; a pair of power supply members disposed on the unformed portion of the substrate; and a connecting portion formed on the substrate and connecting the light emitting diode and the pair of power supply members. A part of an end edge of the recess portion conforms to a part of a side edge of the substrate.

7 Claims, 3 Drawing Sheets

LIGHT SOURCE MODULE AND VEHICULAR LAMP

BACKGROUND OF INVENTION

1. Field of the Invention

The present invention relates to a light source module and a vehicular lamp. Specifically, it relates to downsizing parts of a light source module and a vehicular lamp.

2. Related Art

There are light source modules using light emitting diodes (LED) as a light source, and such a light source module is provided in, for example, a vehicular lamp radiating light directed from a light source as illumination light (for example, refer to Patent Document 1).

Among light source modules, there are modules that have a shallow recess portion formed in an area other than the peripheral portion of a substrate, and a plurality of light emitting diodes disposed on the recess portion (for example, refer to Patent Document 2).

The recess portion formed in the substrate is an area necessary for, for example, the bottom face (the face to have light emitting diodes disposed thereon) to function as a radiating face for the light emitting diodes.

[Patent Document 1] Japanese Patent Application Laid-Open (Kokai) No. JP-A-2008-16362

[Patent Document 2] Japanese Patent Application Laid-Open (Kokai) No. JP-A-2006-73842

SUMMARY OF INVENTION

However, regarding the light source module described in Patent Document 2, the shallow recess portion ("non-through hole 11" in Patent Document 2) is formed in the area other than the peripheral portion of the substrate to dispose light emitting diodes, and there is a problem of increase in size when the area of the peripheral portion, which is the area not having the recess portion formed therein, is large.

That is, although the peripheral portion of the substrate is necessary to dispose a connecting portion, power supply members, and the like for connecting with an external power supply, the substrate becomes needlessly large when the peripheral portion is formed larger than the space to dispose such a connecting portion, power supply members, and the like.

In addition, regarding the light source module described in Patent Document 2, recess portions are formed in a large base substrate ("wiring substrate 1" in Patent Document 2) at regular intervals longitudinally and laterally, and a certain area between a recess portion and another recess portion is cut so that areas other than the cut area are used as substrates.

Accordingly, because the unnecessary area is cut and is not used as a substrate, there is a lot of waste in the base substrate, and there are also disadvantages, such as increase of cutting spots and longer period of time for substrate formation.

In one or more embodiments, a light source module and a vehicular lamp according to the present invention achieves downsizing and the like.

In one or more embodiments, a light source module comprises a substrate comprising a recess portion formed on one face and an unformed portion not having the recess portion formed therein, a light emitting diode disposed on the recess portion of the substrate, a pair of power supply members disposed on the unformed portion of the substrate, and a connecting portion formed on the substrate and connecting the light emitting diode and the pair of power supply members, wherein a part of an end edge of the recess portion conforms to a part of a side edge of the substrate.

In one or more embodiments, the vehicular lamp comprises a light source module disposed in a lamp chamber and an optical member exhibiting a predetermined function to light directed from the light source module, and the light source module comprises a substrate comprising a recess portion formed on one face and an unformed portion not having the recess portion formed therein, a light emitting diode disposed on the recess portion of the substrate, a pair of power supply members disposed on the unformed portion of the substrate, and a connecting portion formed on the substrate and connecting the light emitting diode and the pair of power supply members, wherein a part of an end edge of the recess portion conforms to a part of a side edge of the substrate.

Accordingly, in the light source module and the vehicular lamp, no unformed portion exists outside a part of the end edge of the recess portion.

The light source module in accordance with one or more embodiments of the present invention is provided with a substrate made with a recess portion formed on one face and an unformed portion not having the recess portion formed therein, a light emitting diode disposed on the recess portion of the substrate, a pair of power supply members disposed on the unformed portion of the substrate, and a connecting portion formed on the substrate and connecting the light emitting diode and the pair of power supply members, wherein a part of an end edge of the recess portion conforms to a part of a side edge of the substrate.

Accordingly, the unnecessary area in the substrate can be reduced and it is possible to downsize the light source module.

In one or more embodiments of the invention, the substrate is provided with an insulating portion not having conductivity and a conductive portion having conductivity in lamination, and fixed gaps are formed between the pair of power supply members and the side edge of the substrate.

Accordingly, it is possible to avoid contact of the conductive portion exposed on a side face of the substrate and the power supply members and is possible to prevent short circuit.

The vehicular lamp in accordance with one or more embodiments of the present invention comprises a light source module disposed in a lamp chamber and an optical member exhibiting a predetermined function to light directed from the light source module, and the light source module comprises a substrate comprising a recess portion formed on one face and an unformed portion not having the recess portion formed therein, a light emitting diode disposed on the recess portion of the substrate, a pair of power supply members disposed on the unformed portion of the substrate, and a connecting portion formed on the substrate and connecting the light emitting diode and the pair of power supply members, wherein a part of an end edge of the recess portion conforms to a part of a side edge of the substrate.

Accordingly, the unnecessary area in the substrate can be reduced and it is possible to downsize the vehicular lamp.

Other aspects and advantages of the invention will be apparent from the following description, the drawings and the claims.

DETAILED DESCRIPTION

A light source module and a vehicular lamp in accordance with embodiments of the present invention are described below with reference to the attached drawings.

The embodiments shown below relate to a vehicular lamp and a light source module provided in a vehicular headlamp. It should be noted that the range of applications of the present invention is not limited to a vehicular headlamp and a light source module provided in a vehicular headlamp, and embodiments of the present invention can be applied to various other vehicular lamps and light source modules provided in vehicular lamps that are mounted to vehicle bodies.

Vehicular lamps (vehicular headlamps) 1 are mounted respectively to both right and left end portions in a front end portion of a vehicle body.

Figure 1:
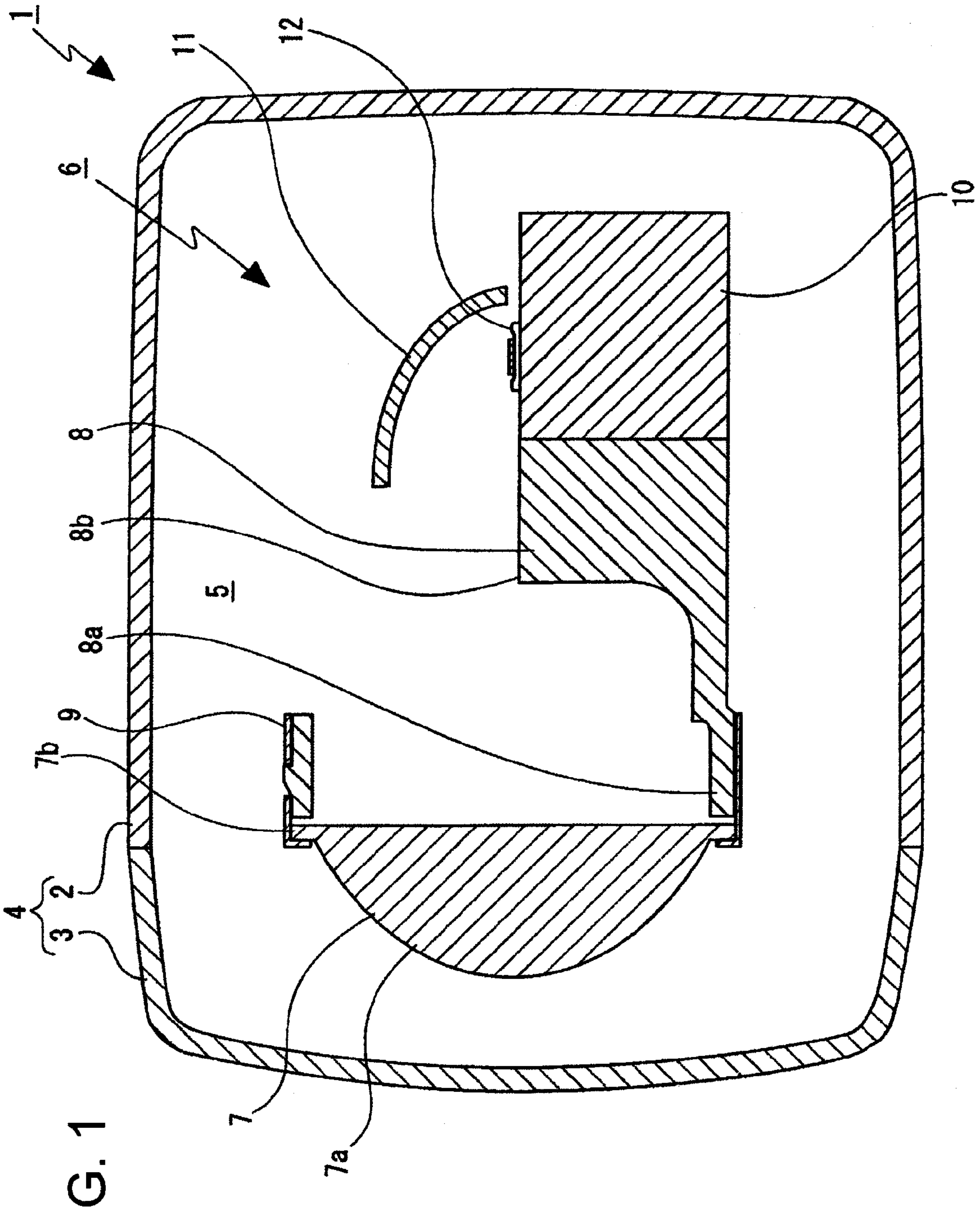
FIG. 1 shows an embodiment of the present invention, together with FIG. 2 through FIG. 4, and is a diagrammatic cross sectional view of a vehicular lamp.

The vehicular lamp 1 is, as shown in FIG. 1, provided with a lamp body 2 having a recess portion that opens forward and a cover 3 that covers the opening face of the lamp body 2, and an outer lamp housing 4 is configured with the lamp body 2 and the cover 3. Inside of the outer lamp housing 4 is formed as a lamp chamber 5.

A lamp unit 6 is disposed in the lamp chamber 5. The lamp unit 6 is tiltably held by a light axis adjustment mechanism (not shown) in the lamp body 2.

The lamp unit 6 is provided with a lens 7 and a lens supporting member 8 for supporting the lens 7.

The lens 7 is configured such that a light transmissive portion **7*a* formed in a generally hemispherical shape and a supported portion 7*b* in a flange shape extending outwardly from the peripheral edge of the light transmissive portion 7*a*** are integrally formed using a transparent material.

The lens 7 functions as an optical member exhibiting a function of forwardly projecting light directed from light emitting diodes (light source), which will be described later.

The lens supporting member 8 is configured such that a supporting portion **8*a* formed in a generally cylindrical shape and a shade portion 8*b* continued to a rear end of the supporting portion 8*a* are integrally formed. The lens supporting member 8 has the shade portion 8*b*** functioning as an optical member that exhibits a function of blocking a part of light directed from the light emitting diodes (light source).

The supported portion **7*b* of the lens 7 and the supporting portion 8*a* of the lens supporting member 8 are coupled by a lens holder 9**.

A light source supporting member 10 is mounted on a rear face of the lens supporting member 8. The light source supporting member 10 functions as a radiator member that radiates heat generated in a light source module as will be described later.

A reflector 11 is disposed above the light source supporting member 10. The reflector 11 functions as an optical member exhibiting a function of reflecting light directed from the light emitting diodes (light source) to guide the light to the lens 7.

A light source module 12 is mounted on an upper face of the light source supporting member 10.

Figure 2:
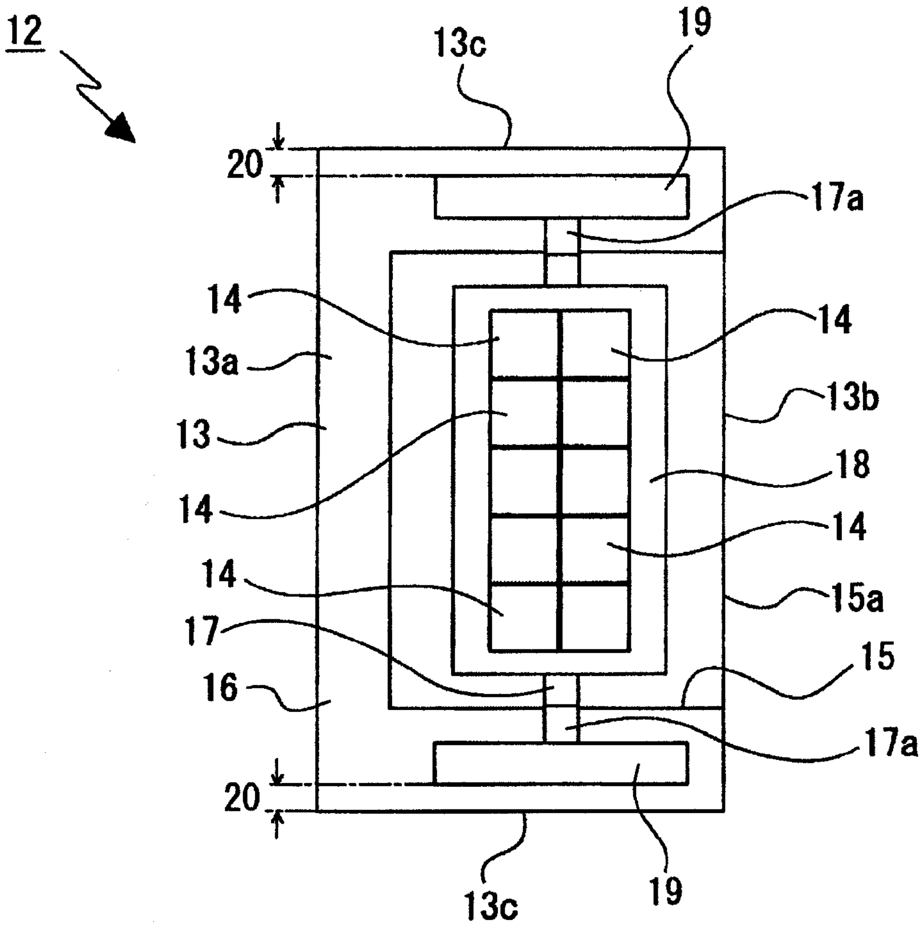
FIG. 2 is an enlarged diagrammatic plan view of a light source module.
Figure 3:
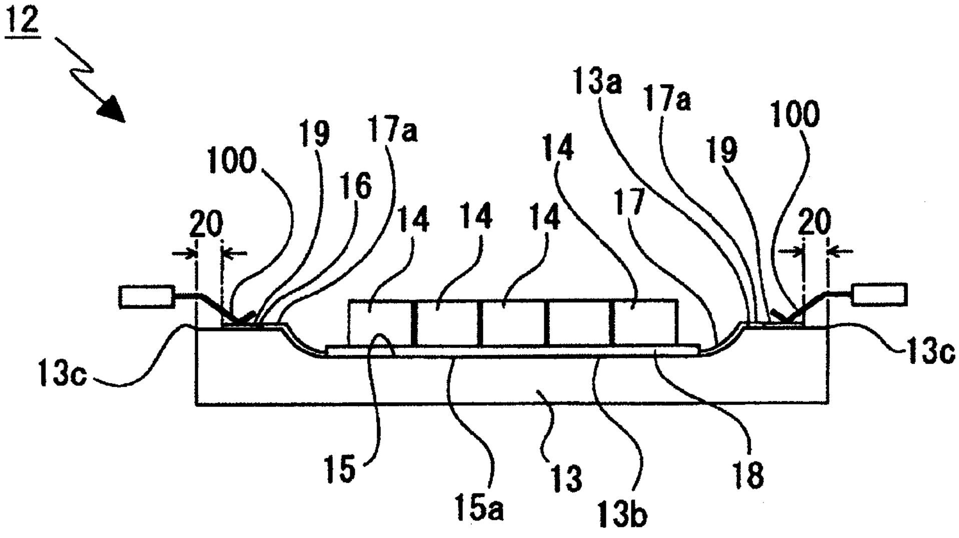
FIG. 3 is an enlarged diagrammatic side view of the light source module.

The light source module 12 has a substrate 13 and a plurality of light emitting diodes (LED) 14 disposed on the substrate 13 (refer to FIG. 2 and FIG. 3). As the light emitting diodes 14, it is possible to use those emitting light in any color, such as red or white.

The substrate 13 is formed, for example, in a rectangular shape and provided with an insulating portion not having conductivity and a conductive portion having conductivity in lamination. The insulating portion is formed with, for example, an epoxy based resin material, and the conductive portion is located below the insulating portion and formed with, for example, aluminum.

In the substrate 13, a shallow recess portion 15 is formed, for example, in a rectangular shape in an area on one face **13*a* other than both end portions in a longitudinal direction and one end portion in a lateral direction. That is, one end edge 15*a* of the recess portion 15 conforms to one side edge 13*b* of the substrate 13. The area of the substrate 13 in which the recess portion 15 is not formed is provided as an unformed portion 16**.

The recess portion 15 is formed such that the conductive portion is exposed by a so-called countersinking process that grinds the insulating portion of the substrate 13. The recess portion 15 is an area necessary to ensure the good flatness of the conductive portion to dispose the light emitting diodes 14 in a required orientation.

In addition, the recess portion 15 is also an area necessary to dispose the light emitting diodes 14 on the conductive portion in order to improve the radiating property.

A connecting portion 17 is formed on the one face **13*a* of the substrate 13. The connecting portion 17 is a circuit pattern to connect the light emitting diodes 14 and is formed by, for example, being plated with copper on the one face 13*a***.

Beside the connecting portion 17 formed in the recess portion 15, both end portions **17*a* are formed across the recess portion 15 to the unformed portion 16**.

The light emitting diodes 14 are disposed on the connecting portion 17 formed in the recess portion 15.

A pressing frame 18 is disposed on the recess portion 15 so as to surround the light emitting diodes 14.

In the unformed portion 16, power supply members 19 having a plate form are mounted respectively to both end portions in the longitudinal direction of the substrate 13. The power supply members 19 are connected respectively to the both end portions **17*a* of the connecting portion 17. Between side edges 13*c* in the longitudinal direction of the substrate 13 and the power supply members 19 fixed gaps 20** are formed respectively.

To the power supply members 19 connection terminals 100 having elasticity are connected. The connection terminals 100 are of power supply attachments respectively connected to power supply circuits (not shown) (refer to FIG. 3). Accordingly, a driving current is supplied from the power supply circuits to the light emitting diodes 14 via the power supply attachments, the power supply members 19, and the connecting portion 17. Thus, the light emitting diodes 14 emit light.

It should be noted that, by connecting the connection terminals 100 having elasticity to the power supply members 19, it is possible to prevent the occurrence of defects such as connection failure due to solder separation in an atmosphere at high temperature, as compared to a case of supplying a driving current from an power supply circuit by mounting a connector to the power supply members 19 by soldering.

In particular, when solder is used, separation is likely to occur due to a decrease in hardness of solder at high temperature. Therefore, it is highly useful to connect the connection terminals 100 having elasticity to the power supply members 19 in a lamp where the temperature of a lamp chamber easily rises, such as a vehicular headlamp.

Figure 4:
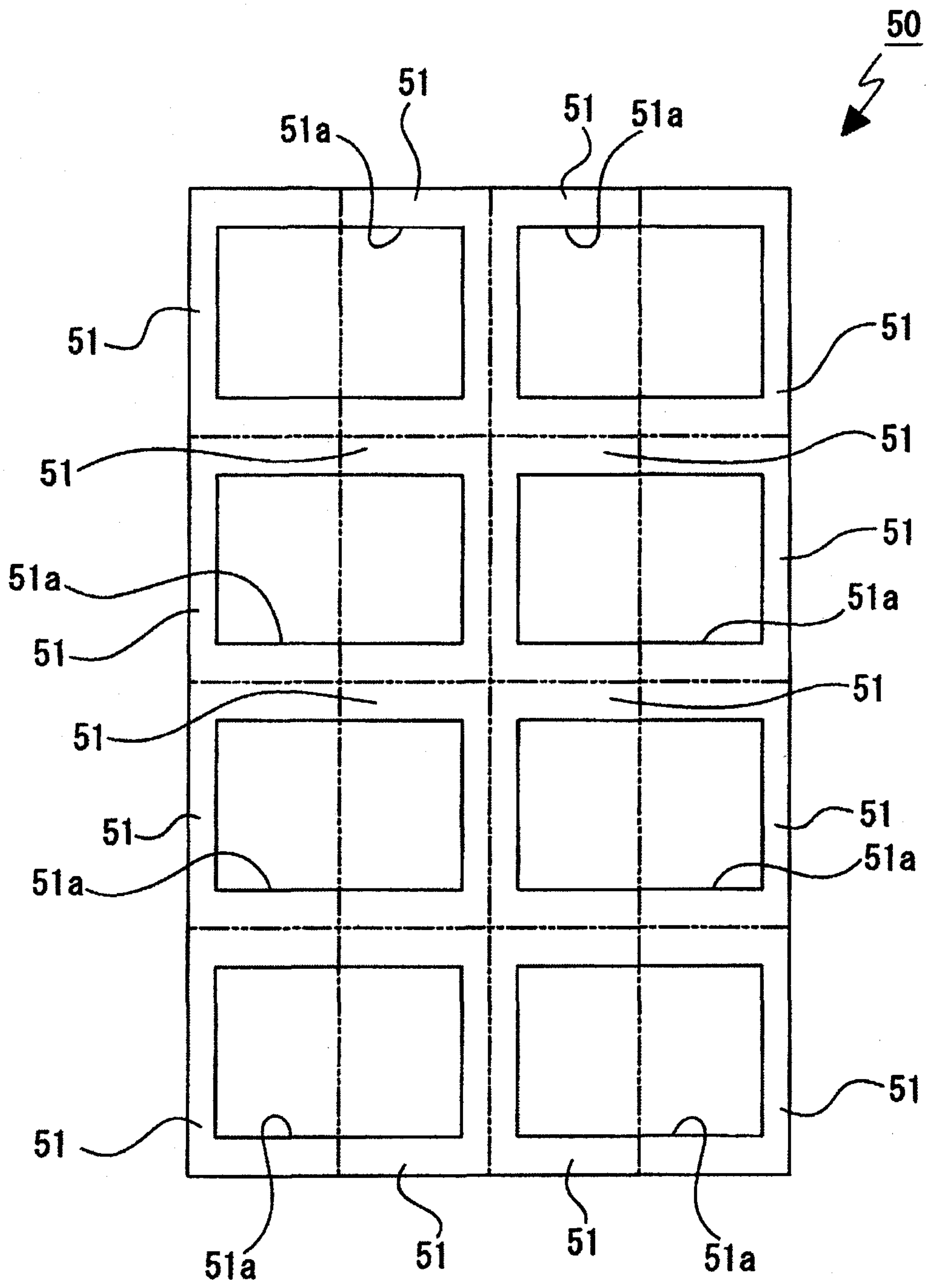
FIG. 4 is a schematic view for illustrating a method of forming a substrate.

A method of forming the substrate 13 is described below (refer to FIG. 4).

Firstly, a base substrate 50 is prepared. The base substrate 50 is a substrate to be a basis for forming substrates 13 and is formed in a plate form of a large area.

Next, the base substrate 50 is sectioned into regions 51 of a number corresponding to the number and the size of the formed substrates 13, and two regions 51 are defined as a pair to form a shallow recessed portion 51*a* spanning the two regions 51 by a cutting process. The recessed portion 51*a* is formed such that the two regions 51 each account for half the surface area of the recessed portion 51*a*.

Lastly, the base substrate 50 is cut into each of the regions 51 and each of the cut areas is formed as the substrates 13. By being cut, the recessed portion 51*a* is divided into two recess portions 15.

By forming the substrates 13 by processing the base substrate 50 as above, the number of processes for the recessed portion 51*a* can be reduced and it is possible to speed up and facilitate the operation of forming the substrates 13.

In addition, because the entire area of the base substrate 50 is used as the substrates 13, it is possible to eliminate a waste of the base substrate 50.

As described above, regarding the light source module 12, because the end edge 15*a* of the recess portion 15 is made to conform to the side edge 13*b* of the substrate 13, the unnecessary area in the substrate 13 can be reduced, thereby enabling downsizing.

In addition, because the fixed gaps 20 are formed between the side edges 13*c* in the longitudinal direction of the substrate 13 and the power supply members 19, it is possible to avoid contact of the conductive portion exposed on the side face of the substrate 13 and the power supply members 19, and is possible to prevent short circuit.

While description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF THE REFERENCE NUMERALS

1 VEHICULAR LAMP
5 LAMP CHAMBER
12 LIGHT SOURCE MODULE
13 SUBSTRATE
13*a* ONE FACE
13*b* SIDE EDGE
14 LIGHT EMITTING DIODE
15 RECESS PORTION
15*a* END EDGE
16 UNFORMED PORTION
17 CONNECTING PORTION
19 POWER SUPPLY MEMBER
20 GAP

What is claimed is:

1. A method of manufacturing a vehicular lamp comprising manufacturing a light source module by a method comprising:
   - forming a recess portion on one face of a substrate such that a part of an end edge of the recess portion conforms to a part of a side edge of the substrate, and an unformed portion not having the recess portion therein is maintained on the one face of the substrate;
   - disposing a light emitting diode on the recess portion of the substrate;
   - disposing a pair of power supply members on the unformed portion of the substrate;
   - forming a connecting portion on the substrate;
   - connecting the light emitting diode and the pair of power supply members; and
   - wherein the substrate is manufactured by:
     - providing a base substrate having a plate form and an area at least twice as large as an area of the substrate;
     - countersinking a base recess into the base substrate such that no part of an end edge of the base recess conforms to any part of a side edge of the base substrate; and
     - cutting the base substrate through the base recess so as to form at least two light source modules.

2. The method of manufacturing a vehicular lamp according to claim 1, wherein the method of manufacturing the light source module further comprises: providing the substrate with an insulating portion not having conductivity and a conductive portion having conductivity in lamination, and forming fixed gaps between the pair of power supply members and the side edge of the substrate.

3. The method of manufacturing a vehicular lamp according to claim 1, wherein the method of manufacturing the light source module further comprises: providing the substrate with an insulating portion not having conductivity and a conductive portion having conductivity in lamination.

4. The method of manufacturing a vehicular lamp according to claim 3, wherein the method of manufacturing the light source module further comprises: forming the insulating portion with an epoxy based resin material, forming the conductive portion with aluminum, and disposing the conductive portion below the insulating portion.

5. The method of manufacturing a vehicular lamp according to claim 1, wherein the method of manufacturing the light source module further comprises: forming fixed gaps between the pair of power supply members and the side edge of the substrate.

6. The method of manufacturing a vehicular lamp according to claim 1, wherein the method of manufacturing the light source module further comprises: connecting connection terminals having elasticity to the power supply members.

7. The method of manufacturing a vehicular lamp according to claim 1, further comprising: disposing the light source module in a lamp chamber, and disposing an optical member so as to exhibit a predetermined function to light directed from the light source module.

* * * * *